March 13, 1956  N. J. MEDVEDEFF  2,738,146
CONVERTIPLANE
Filed Feb. 19, 1953  9 Sheets-Sheet 1

Inventor:
Nicholas J. Medvedeff,
by C. Yardley Chittick
Attorney

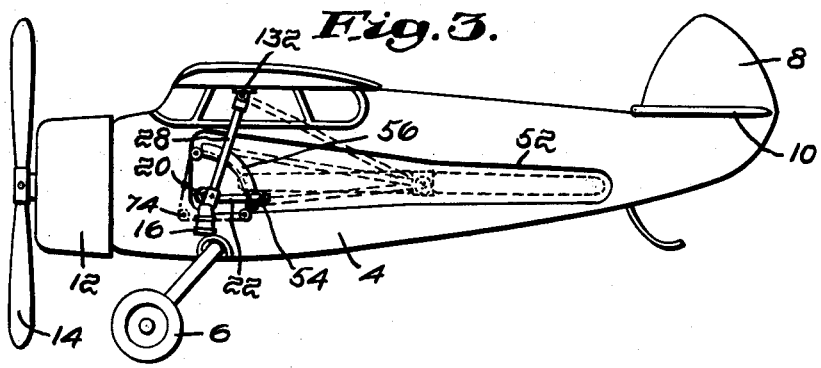
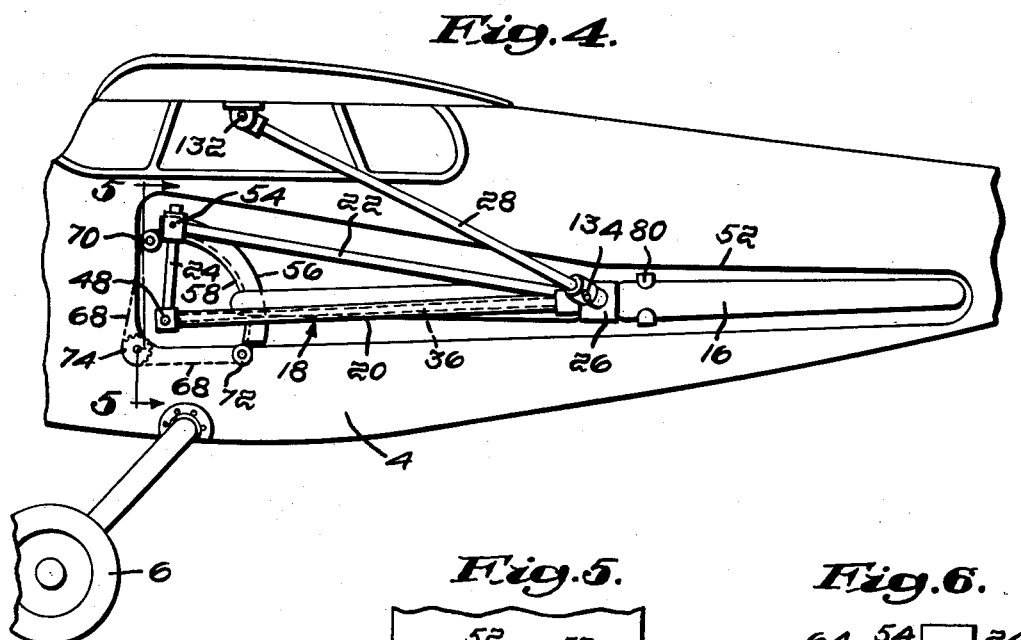
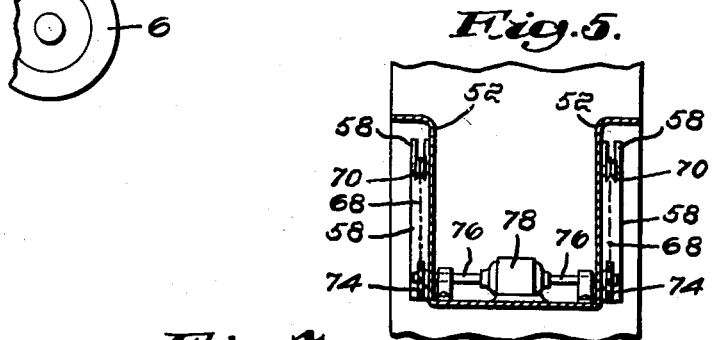
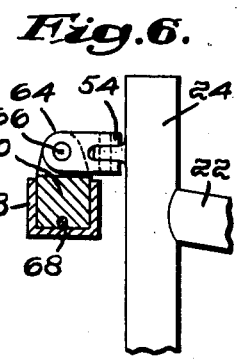
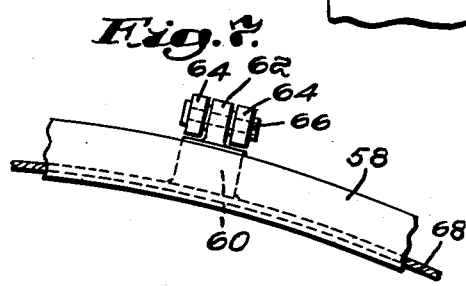

March 13, 1956 N. J. MEDVEDEFF 2,738,146
CONVERTIPLANE
Filed Feb. 19, 1953 9 Sheets-Sheet 3
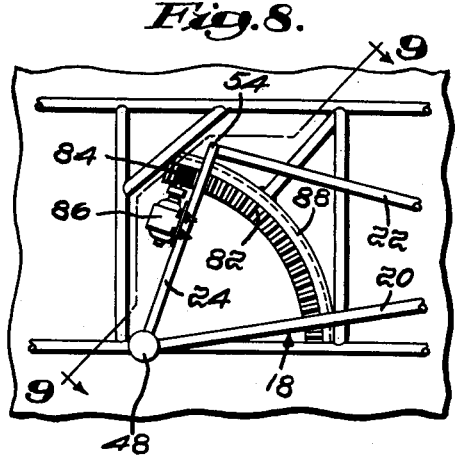
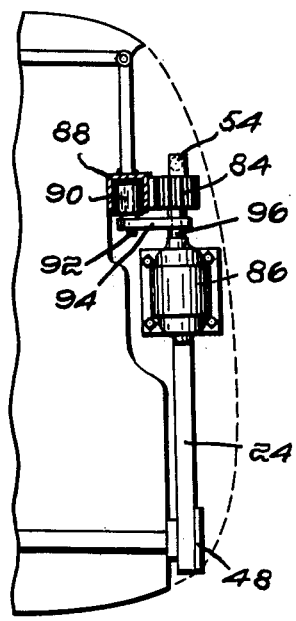
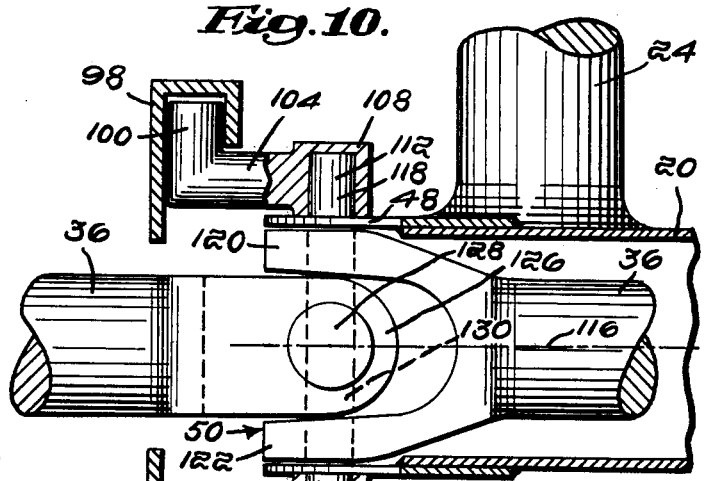
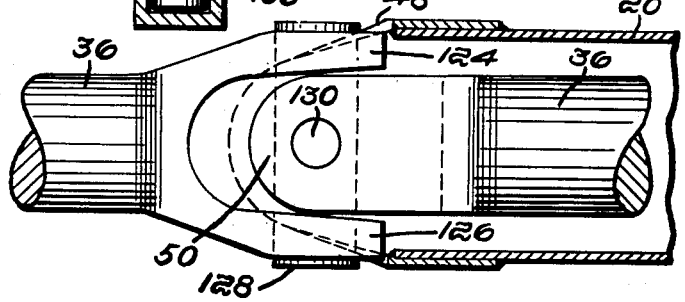
Inventor:
Nicholas J. Medvedeff,
by Cursley Chittick
Attorney

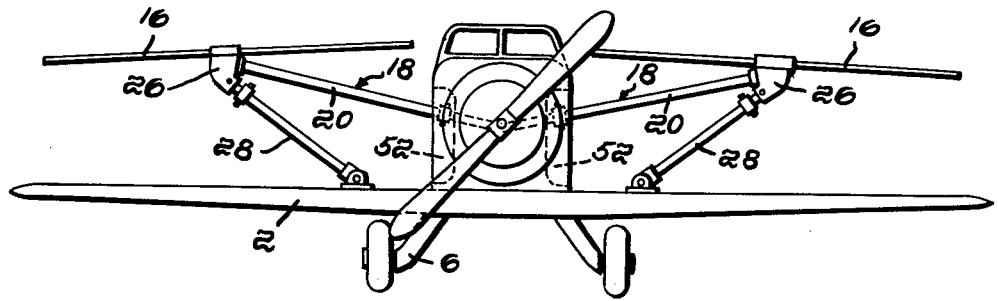
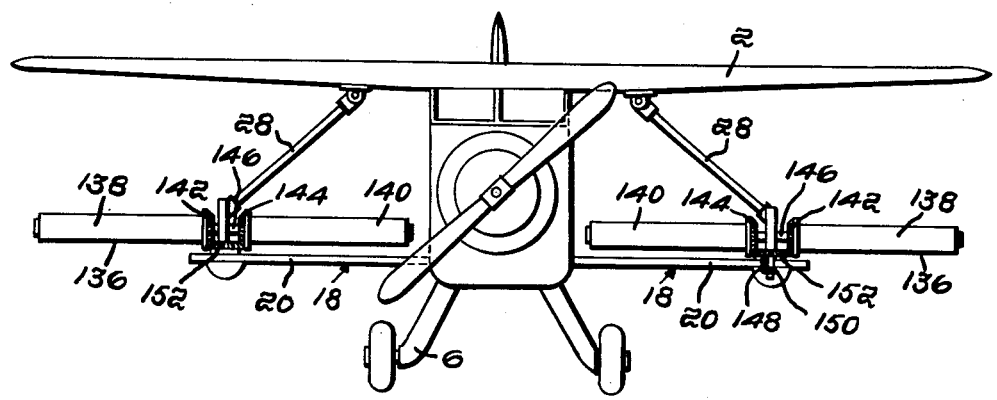
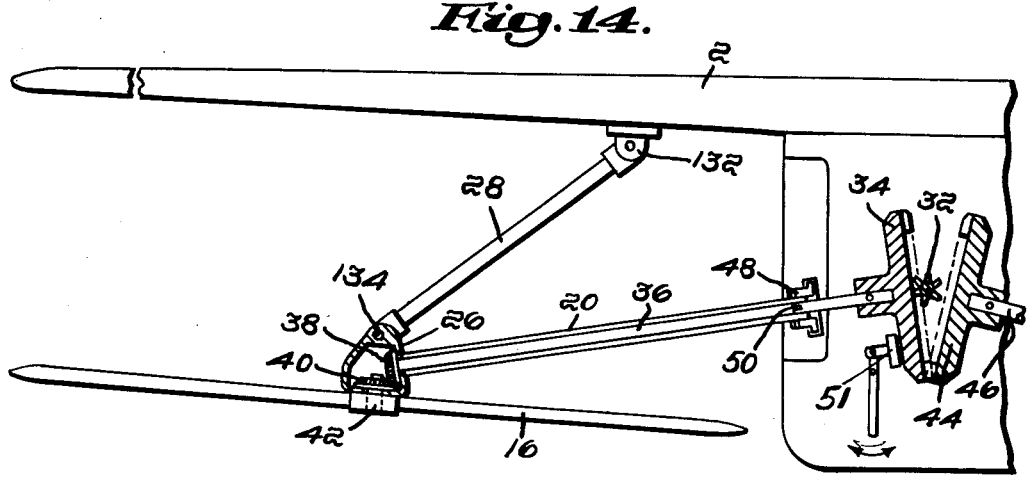

March 13, 1956     N. J. MEDVEDEFF     2,738,146
CONVERTIPLANE
Filed Feb. 19, 1953     9 Sheets—Sheet 5

Inventor:
Nicholas J. Medvedeff,
by Yardley Chittick
Attorney

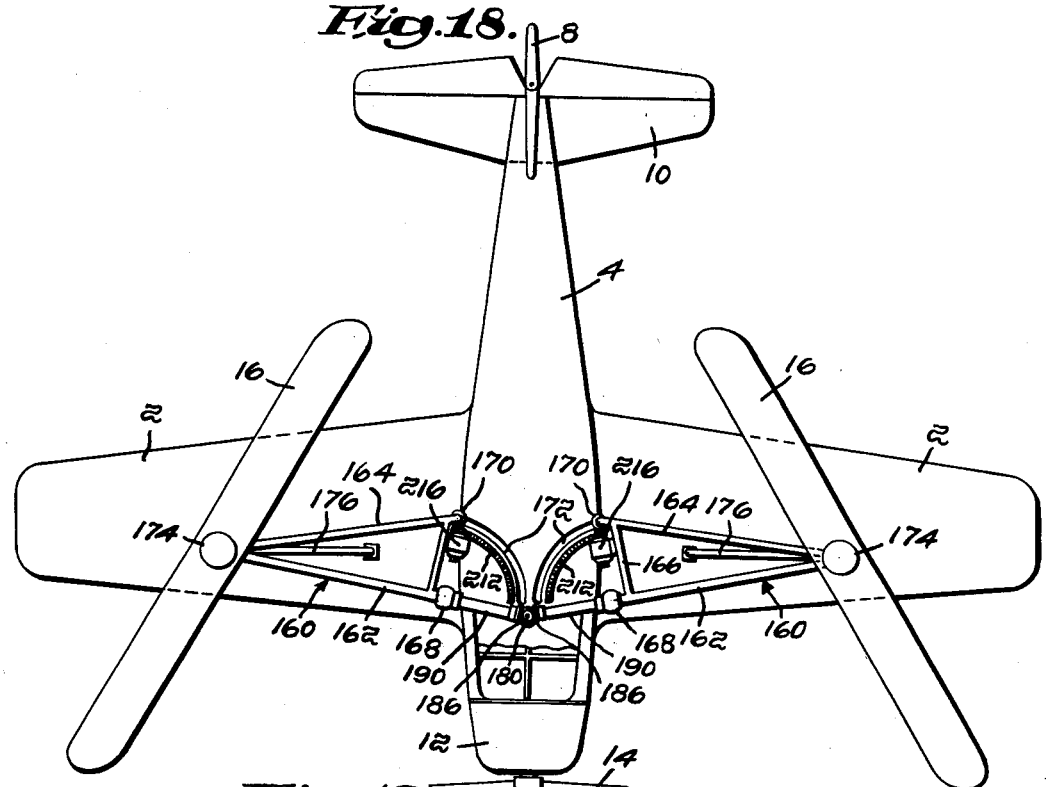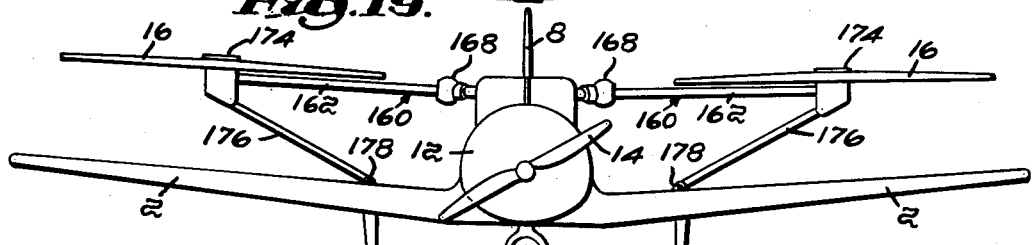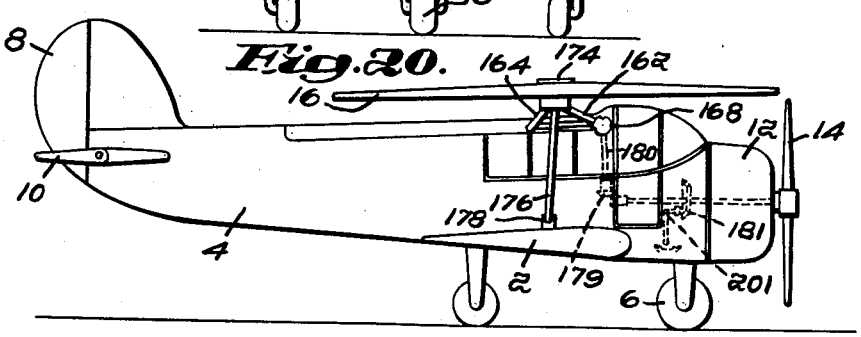

March 13, 1956     N. J. MEDVEDEFF     2,738,146
CONVERTIPLANE

Filed Feb. 19, 1953     9 Sheets-Sheet 7

Inventor:
Nicholas J. Medvedeff,
by C. Yardley Chittick
Attorney

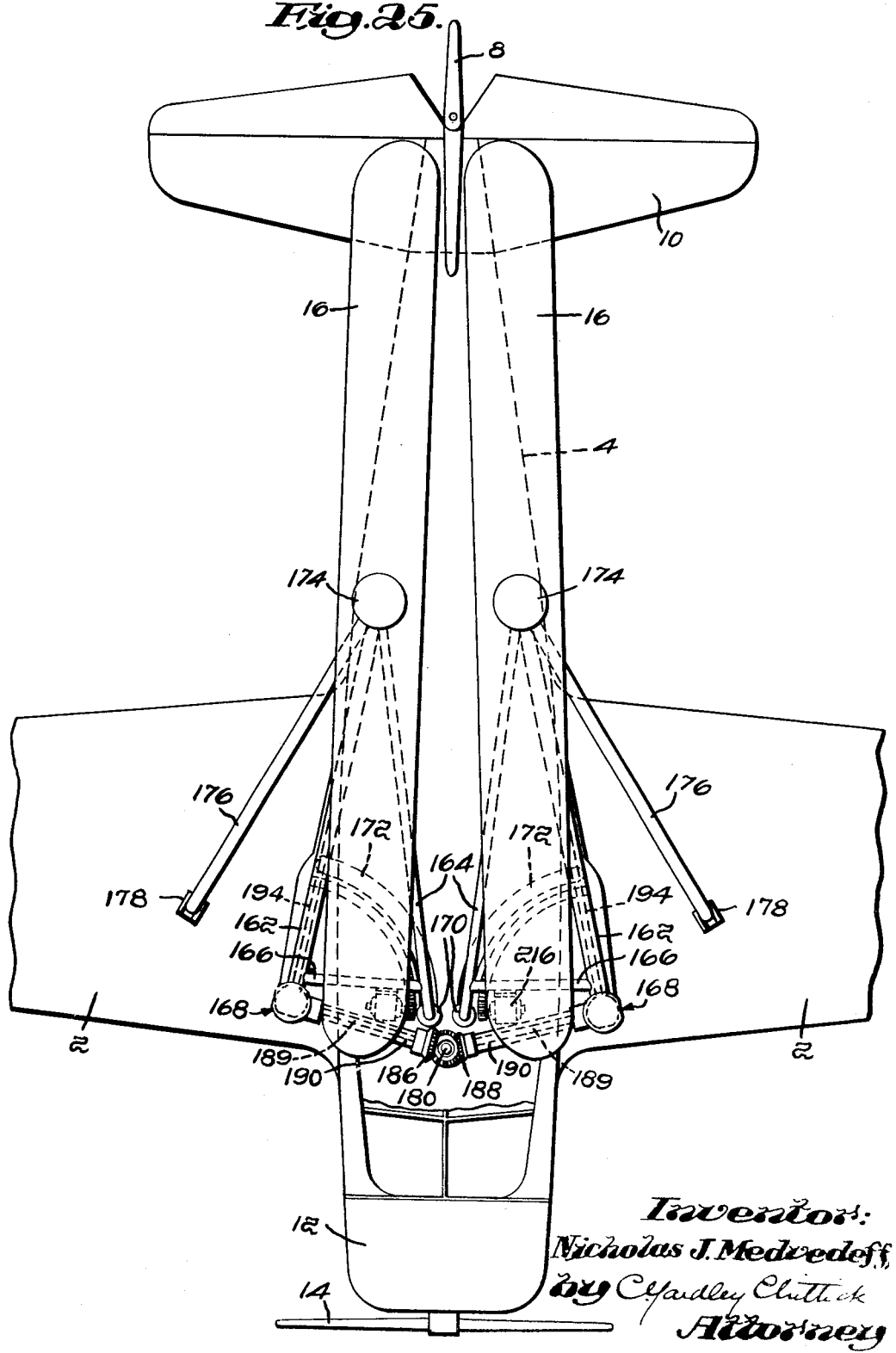

March 13, 1956  N. J. MEDVEDEFF  2,738,146
CONVERTIPLANE
Filed Feb. 19, 1953  9 Sheets-Sheet 9
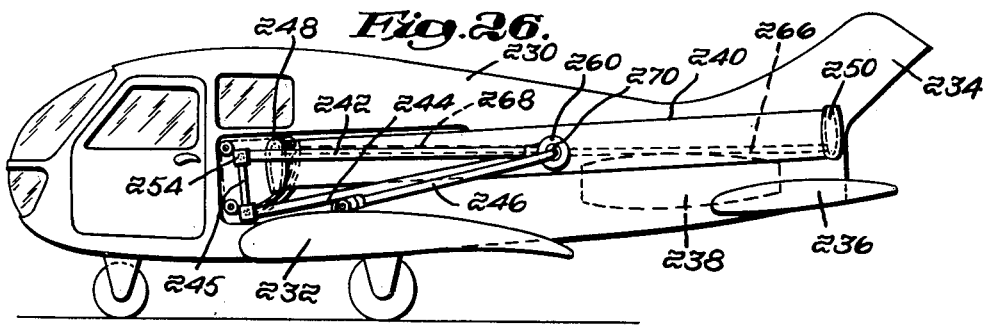
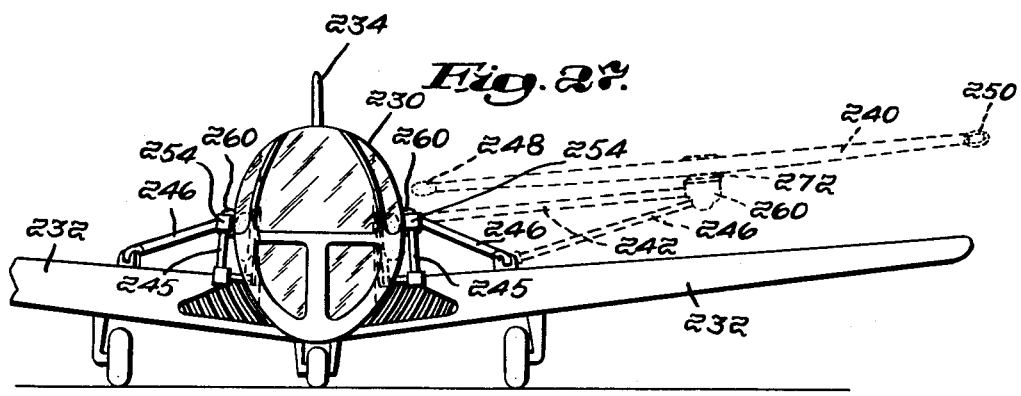
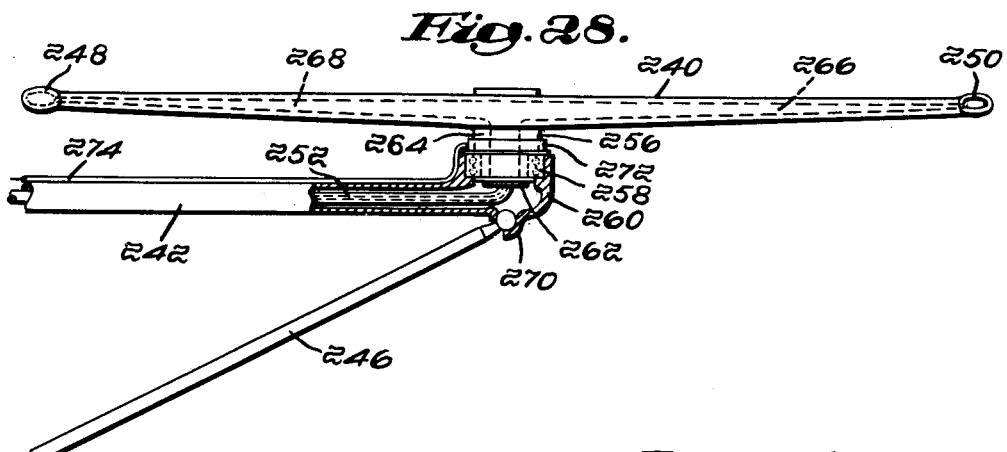
Inventor:
Nicholas J. Medvedeff,
by Chadley Chittick
Attorney

United States Patent Office 2,738,146
Patented Mar. 13, 1956

2,738,146

CONVERTIPLANE

Nicholas J. Medvedeff, Hanover, Mass.

Application February 19, 1953, Serial No. 337,783

19 Claims. (Cl. 244—6)

This application is a continuation-in-part application of the Nicholas J. Medvedeff application filed July 3, 1950, Serial No. 171,885, now abandoned.

This invention relates to heavier than air aircraft. The invention is particularly concerned with the provision of an aircraft which may take off vertically from the ground, as a helicopter, rise to a suitable altitude, then commence forward motion to reach a speed at which it will be sustained by its wings to fly in the normal manner with the helicopter blades stowed out of the airstream. On reaching its destination the reverse procedure will be followed. The machine will be slowed down to transfer the load from the wings to the helicopter blades after which it may descend vertically to the ground.

The invention contemplates the provision of helicopter propellers or blades which will have sufficient lift to raise the machine vertically to a proper height and then to bring the machine into forward motion at a velocity sufficient to enable the wings to take over the load, after which the helicopter blades are folded back into the fuselage where the drag will be relatively slight. Thus, the machine will be enabled to fly at forward speeds commensurate with the speed of a conventional airplane of the same size and horsepower.

The present invention contemplates further that the helicopter blade construction will not need to incorporate the more complicated mechanisms that are required in conventional helicopter construction. This is made possible because the maximum forward speed necessary before the wing can begin to sustain the load will be in the order of 50 to 60 miles an hour. Such forward velocity does not require helicopter blade controls of the type that would be required if a forward speed of say 90 to 100 miles an hour were necessary through the use of helicopter blades alone before support could be transferred to the wing.

The helicopter blades when in operation may be positioned either below or above the wing of the machine and will be positioned at a point substantially transverse of and in line with the center of gravity so that the machine may rise on an even keel. This will be true whether the helicopter blades are above or below the wing. The helicopter blades, one under each wing, may be driven by the same motor that drives the conventional propeller or they may be driven by an auxiliary motor designed solely for that purpose. In the interests of reducing the weight, it is preferable that the same motor be used for all of the propeller blades. A modification of the invention provides helicopter blades above and below each wing.

A further modification will use jet propulsion to provide forward motion to the plane and rotation of the helicopter blades. This arrangement may be additionally modified if desired by using a conventional propeller to cause forward motion of the plane and jet actuated helicopter blades.

Another object of the invention is to provide the combination of a conventional high or low winged convertiplane with rotating cylinders therebelow or thereabove, respectively, which cylinders are substituted for the helicopter blades. Such rotating cylinders are of a character which will produce the well known "Magnus effect" to give a high degree of lift.

Whether helicopter blades or rotating cylinders are used to raise the machine vertically, it is contemplated that the construction will be such that should motor failure occur, free wheeling of the vertical lift blades or cylinders will be provided so that these parts will be subject to auto rotation to allow the machine to descend vertically in the usual manner and without damage.

These and other objects of the invention will be understood in greater detail as the description proceeds with the aid of the accompanying drawings, in which:

Fig. 3 is a side elevation of Fig. 1 showing the stowed position of the helicopter blade in dotted line.

Fig. 4 is an enlarged side elevation of the fuselage showing in more retail the stowed position of the port helicopter blade.

Fig. 5 is a vertical section through the fuselage on line 5—5 of Fig. 4.

Fig. 6 is a sectional detail showing means for swinging the helicopter strut to folded position.

Fig. 7 is a side elevation of the construction shown in Fig. 6.

Fig. 8 is a side elevation of part of the air frame showing modified mechanism for swinging the helicopter strut to folded position.

Fig. 9 is an enlarged section on the line 9—9 of Fig. 8.

Fig. 10 is an enlarged horizontal section of the universal joint through which the helicopter blade driveshaft extends.

Fig. 11 is a side elevation of the construction shown in Fig. 10 with the housing shown in section.

Fig. 12 is a front elevation of a modified construction in which the helicopter blades are above the wing.

Fig. 13 is a front elevation of another modification in which rotating rollers have been substituted for the helicopter blades.

Fig. 14 is an enlarged front elevation of one wing and the corresponding helicopter blade showing the driving mechanism for that blade.

Fig. 15 is an enlarged plan view of one of the rotating rollers shown in Fig. 13.

Fig. 18 is a plan view of a modified form of the invention with the rotors in normal operating position.

Fig. 19 is a front view of Fig. 18.

Fig. 20 is a side elevation looking from the left of Fig. 19.

Fig. 25 is a plan view to enlarged scale showing both rotors in retracted position.

Fig. 26 is a side elevation of a modified form of the invention in which jet propulsion is used to drive the plane forward in normal flight and the helicopter rotors are provided with jet propulsion in their tips in place of the mechanical drive.

Fig. 27 is an elevation of Fig. 26 looking from the left with the dotted line showing one rotor in operating position.

Fig. 28 is an enlarged front elevation of one rotor in operating position.

Figure 1:
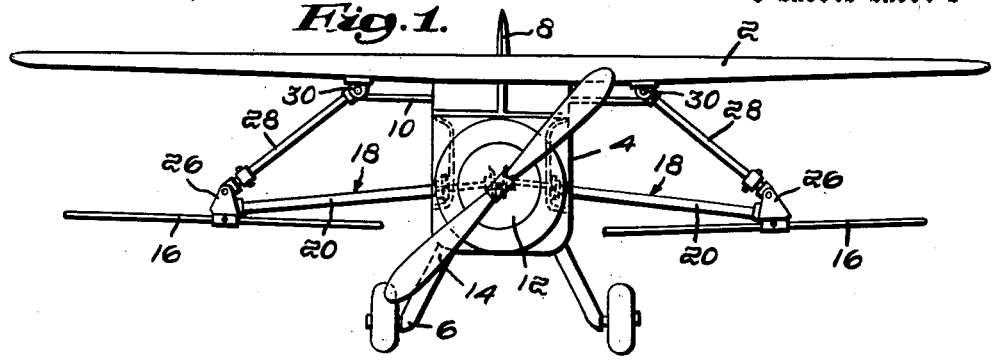
Fig. 1 is a front elevation of one form of the invention.

In Fig. 1 is shown a front elevation of my machine which is a combination of a monoplane and a helicopter. The monoplane comprises a wing 2 secured to a fuselage 4 with landing gear 6, rudder 8, elevators 10, motor 12 and thrust propeller 14, all of which are conventional.

The invention consists in the addition to a conventional monoplane, of helicopter rotors 16 so mounted that after the machine has been raised by the helicopter blades vertically to a desired height, it may be put into forward motion by changing the pitch of the blades of propeller 14. Then, when the machine has sufficient forward speed to be supported by wing 2, the helicopter blades may be folded back against the sides of the fuselage 4 and with the blades generally parallel to the fuselage, thereby substantially eliminating the drag of the rotors so that the machine may thereafter fly as a conventional monoplane.

While reference is made herein to the fuselage as being that part of the machine into which each rotor is retracted and housed or against which it is placed if fuselage cavities are not desired, still it will be understood that that portion of the machine against which the rotors are located when folded out of operative position may be known in any particular type of convertiplane by another name. It is, therefore, contemplated that the word fuselage as used herein means that part of the machine extending longitudinally adjacent the retracted position of the rotor and having sufficient volume to receive and house the rotor or against which the rotor may be placed when in inoperative condition.

The helicopter rotors are symmetrically identical so that a description of one rotor will suffice for both.

Figure 2:
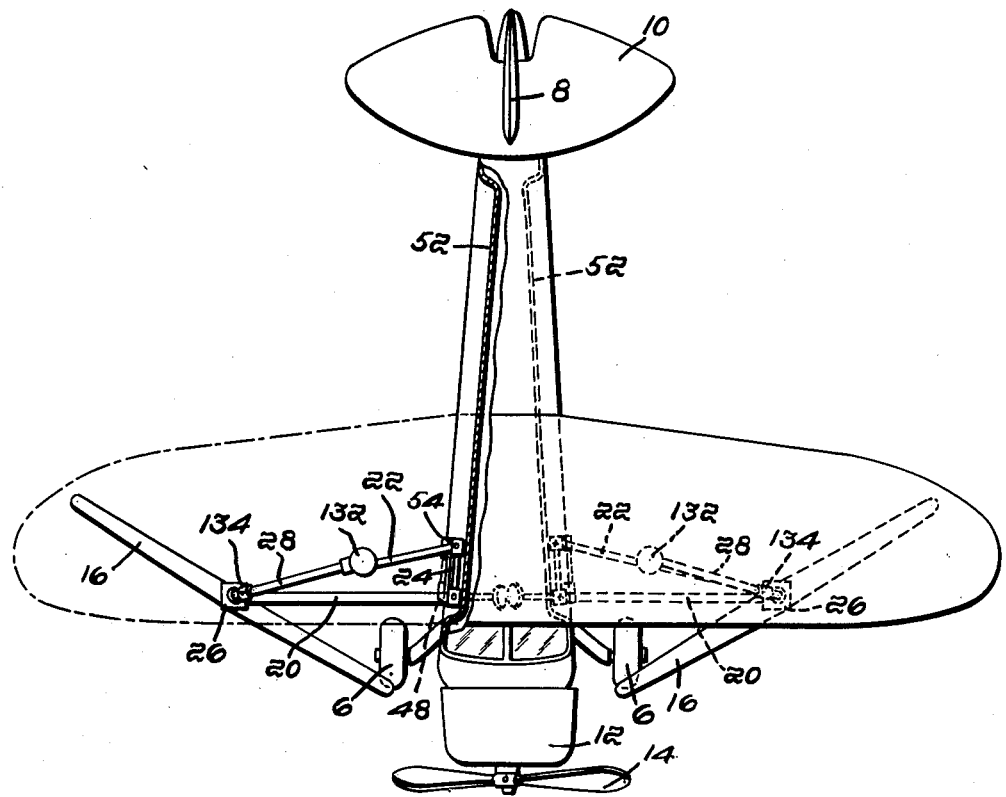
Fig. 2 is a plan elevation with the starboard wing and part of the fuselage cut away.

A triangular truss indicated at 18 in Fig. 1 and shown in plan in Fig. 2 comprises a tubular leading member or leg 20, a tubular rear member or leg 22 and a short tubular member 24 paralleling the fuselage, all welded to form a strong unit. At the outer end of the truss is a gear box 26, hingedly connected to a strut or leg 28 which in turn is hinged at 30 to the underside of wing 2. The members 20 and 22 and strut 28, all of which are fixed with respect to the wing and fuselage during operation of the rotor, constitute a support of three legs of ample strength for the load imposed by the rotor during the lifting operation. The rotors 16 may be driven by an independent motor if desired but in the preferred form they will be driven by the motor 12 through a suitable clutch and gearing mechanism as shown in Fig. 14. In this arrangement, a pinion 32 on the motor shaft drives gear 34 and shaft 36 which extends through tubular member 20 to terminate within gear box 26. A bevelled gear 38 meshes with another bevelled gear 40 fixed to shaft 42 of rotor 16.

Gear 34 meshes with a corresponding gear 44 which drives shaft 46 in the opposite gear box 26 and corresponding gearing drives the second rotor 16.

In this way means is provided for driving both rotors at the same speed and by virtue of the positive gearing between the two rotors, the rotors when at rest can be brought into symmetrical position with respect to the fuselage so that both will fold back into the fuselage in proper alignment therewith.

A universal joint is provided at the junction of member 20 with the fuselage, such universal joint being indicated in enlarged detail in Figs. 10 and 11 at 48. A corresponding universal joint 50 is provided in shaft 36 where it passes through universal joint 48 of member 20. These universal joints make it possible for the two rotors to be swung backwardly into the fuselage when the rotors 16 have come to rest in proper position without disconnecting the shafts 36.

As can be seen in Fig. 3, the rotor 16 has stopped in a position which is substantially at right angles to the fuselage. A brake 51 schematically illustrated in Fig. 14 may be utilized to stop and hold the rotors at the proper angular position. In this position the truss 20 may then be moved with respect to the fuselage so that the rotor will be swung backwardly to lie in a cavity 52 indicated in Figs. 2, 3 and 4. This result is accomplished by the following means. Referring to Figs. 2 and 4, it can be seen that member 20 is pivoted at its inner end to the fuselage by universal joint 48. The inner end of member 22 is secured to a hinge 54 which hinge is also connected to the short member 24. By swinging hinge 54 upwardly along a curved path, as illustrated at 56 in Figs. 3 and 4, the entire structure of the truss 18 which consists of the three members 20, 22 and 24, and the strut 28 will be swung backwardly from the position of Figs. 1, 2 and 3 to the position of Fig. 4. This is a geometrical matter and the proper proportioning of the various elements will achieve this result exactly as required. The rotor 16 will be stopped in a position which will not only enable the universal joint 50 of shaft 36 to bend in the required direction along with universal joint 48 of the casing, but also will enable the rotor to be swung into cavity 52 as indicated. Cavity 52 is sufficiently deep so that the rotor 16 and truss 18 can be moved therein to a position out of the air stream. Thus, substantially all of the drag of these members is eliminated.

It will be understood from the foregoing description that the construction of the port side rotor and truss corresponds with the starboard rotor and truss and that both rotors are simultaneously folded into the fuselage so that the wind pressure on both rotors and associated parts during this procedure remains balanced.

In Figs. 5, 6 and 7 is shown mechanism for accomplishing the movement of hinge 54 from the position shown in Fig. 3 to that shown in Fig. 4. This hinge is mounted in such manner that it is secure against movement laterally of the fuselage. It may, however, be moved arcuately along its track to cause desired movement of the truss 18.

The forward part of cavity 52 is shown in Fig. 5. An arcuate track 58 is positioned therein and securely affixed to the air frame. In this track is a slide 60 having on its outer end an ear 62 to which is hinged by pin 66 a corresponding pair of ears 64. These ears 64 are attached to member 24 as shown in Fig. 6 and constitute the hinge 54 previously referred to. A cable or chain 68 is fastened to slide 60 and runs along the bottom of the track 58 passing over rollers 70 and 72 at the ends of track 58. The cable or chain is continuous and passes over a pulley or gear 74 which is mounted on shaft 76 of reversible motor 78. Thus it can be seen that actuation of motor 78 will cause chain 68 to slide along the bottom of track 58 drawing slide 60 with it. In this manner hinge 54 which is connected to slide 60 can be shifted from the position shown in Fig. 3 to that shown in Fig. 4 by operation of motor 28 in the proper direction. By this means the rotors 16 are automatically, positively and quickly swung from the operating position shown in Figs. 1, 2 and 3 to the inoperative stowed position shown in Fig. 4. A suitable latch as indicated at 80 in Fig. 4 may be installed for grasping rotor 16 in its folded position in cavity 52 to prevent dislodgment during normal flight.

An alternative means for shifting truss 18 from normal operating position to inoperative position is shown in Figs. 8 and 9. In this construction, a rack and motor driven pinion is substituted for the cable and sprocket drive shown in Figs. 4 to 7. As can be seen in Fig. 8, the truss 18 has been swung to inoperative position corresponding substantially to the position of the truss in Fig. 4. An arcuate rack 82 is mounted on the air frame where it may be engaged by pinion 84 driven by motor 86 mounted on member 24. Member 24 swings and pivots about universal joint 48 in the same manner heretofore described. Actuation of motor 86 causes member 24 to shift its position to swing rotor 16 from the position of Fig. 3 to that of Fig. 4.

In order that pinion 84 may remain in firm engagement with rack 82 there is provided, as shown in Fig. 9, an arcuate U-shaped track 88 immediately behind rack 82, having a follower 90 therein connected through shaft 92 and link 94 to the motor shaft 96. Thus, as pinion 84 travels along rack 82, slide 90 will move correspondingly in track 88, the link 94 acting to hold the pinion and rack together.

The details of the universal joint 50 in the drive shaft and universal joint 48 at the junction of members 20 and 24 are shown in Figs. 10 and 11. A circular track 98 is mounted on the airframe. In this are positioned a pair of diametrically opposite studs 100 and 102 having horizontal extensions 104 and 106 to which are connected diametrically opposite sockets 108 and 110 in which are positioned pivots 112 and 114. These latter pivots are affixed to the end of the tubular member 20. It will be obvious from this arrangement that tube 20 may be rotated about its axis 116 and at the same time may be swung about the axis 118. Thus, as member 24 is moved from its normal generally horizontal position to a more vertical position as indicated in Fig. 4, composite rotation and swinging of member 20 may occur so that it may reach stowed position as in Fig. 4.

Universal joint 50 comprises two forked ends 120 and 122 on the rotor side of shaft 36 and another pair of forked ends 124 and 126 on the power side of shaft 36. These two forked ends are connected in the usual manner by a large pin 128 which extends through ends 124 and 126 and a smaller pin 130 which extends transversely pin 128 and through the ends 120 and 122.

By this arrangement, when the clutch that drives engine shaft 32 has been disconnected and rotor 16 has been brought to rest in the proper position prior to stowing, it is apparent that universal joint 50 will enable the drive shaft 36 to bend and fold in a manner that will follow exactly the folding movement of member 20. Brake 51 having served its purpose in stopping the rotors in the proper position may be released to permit the necessary slight rotation of shaft 36 as the folding movement of truss 18 takes place.

It will be understood that suitable bearings will be provided for drive shaft 36 and the related gears. Such bearings are not shown as they are obvious mechanical expedients which would normally be used in such circumstances.

The strut 28 is connected to the underside of wing 2 by a ball and socket joint 132, or its equavalent, and to gear box 26 by a ball and socket joint 134 or its equivalent. The truss 18 and strut 28 provide a supporting structure for rotor 16 which will be adeqate to carry safely the loads that will be imposed thereon by the operation of the rotor.

A modified form of the invention is shown in Fig. 12. In this construction, the airplane is a low winged monoplane instead of the high winged monoplane of Fig. 1. The rotors 16 are positioned above the wing and the supporting trusses 18 and struts 28 are arranged in the same manner as the construction in Figs. 1 to 4 except that they are above rather than below the wing. It is believed unnecessary to repeat the details of this arrangement. That this construction will work the same as that previously described may be readily apparent by viewing Fig. 12 upside down. It is obvious that the swinging of the short member 24 in a downward direction will cause rotors 16 to swing backwardly into cavities 52. The placing of rotor 16 above the wing will not materially affect the lifting power of the rotors because they are a sufficient distance above wing 2. The downward movement of air below rotor 16 spreads laterally rapidly so wing 2 has very little adverse effect on the lifting power in the construction of Fig. 12.

Another modification is shown in Fig. 13. This is identical with the construction of Figs. 1 to 4 as far as the trusses 17 and struts 28 are concerned. There is substituted however, for the rotors 16 a pair of rotating rollers indicated at 136. These rollers are identical and consist of two individual rollers 138 and 140 which have bevelled gears 142 and 144 on their respective inner ends. The rollers are mounted on a common shaft 148 which passes through a vertical shaft 148 having on its lower end in gear box 150 a bevelled gear driven by a gear on the end of the power shaft that extends through member 20. A bevelled gear 152 is fixed on the stationary outer end of member 20 to be engaged by gears 142 and 144. By this arrangement, rotation of shaft 148 will cause rotation in a horizontal plane of shaft 146 and rollers 138 and 140 and at the same time these rollers, because of engagement of gears 142 and 144 with fixed gear 152, are rotated in opposite directions about their common horizontal shaft 146. This causes the well-known "Magnus effect" to produce lift the same as with the helicopter rotors. The rollers 136 may be stowed in the manner heretofore described after the machine has attained sufficient altitude and enough forward speed to be sustained by the wing 2.

In order to increase the safety of the machine, throwing out the clutch between the motor and rotors, or rollers, will enable these units to be subject to auto rotation so that in the event of motor failure the machine may settle to earth at a relatively safe velocity.

Figure 16:
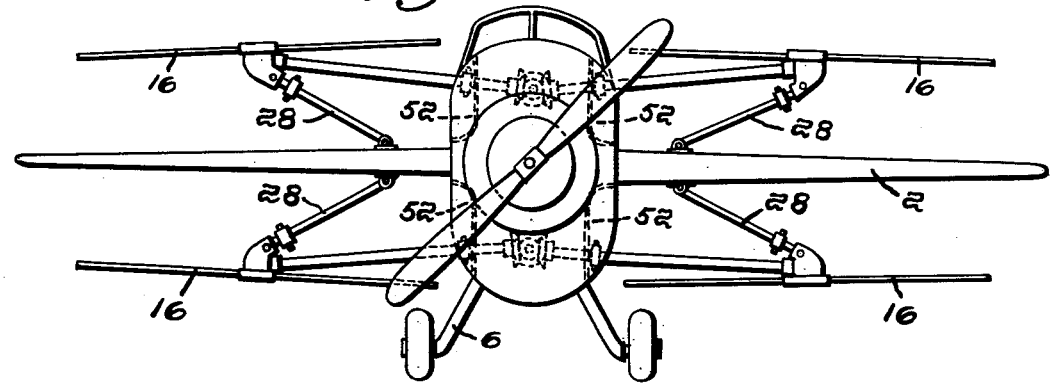
Fig. 16 is a front elevation of a modified form in which two sets of helicopter blades, above and below the wing are employed.
Figure 17:
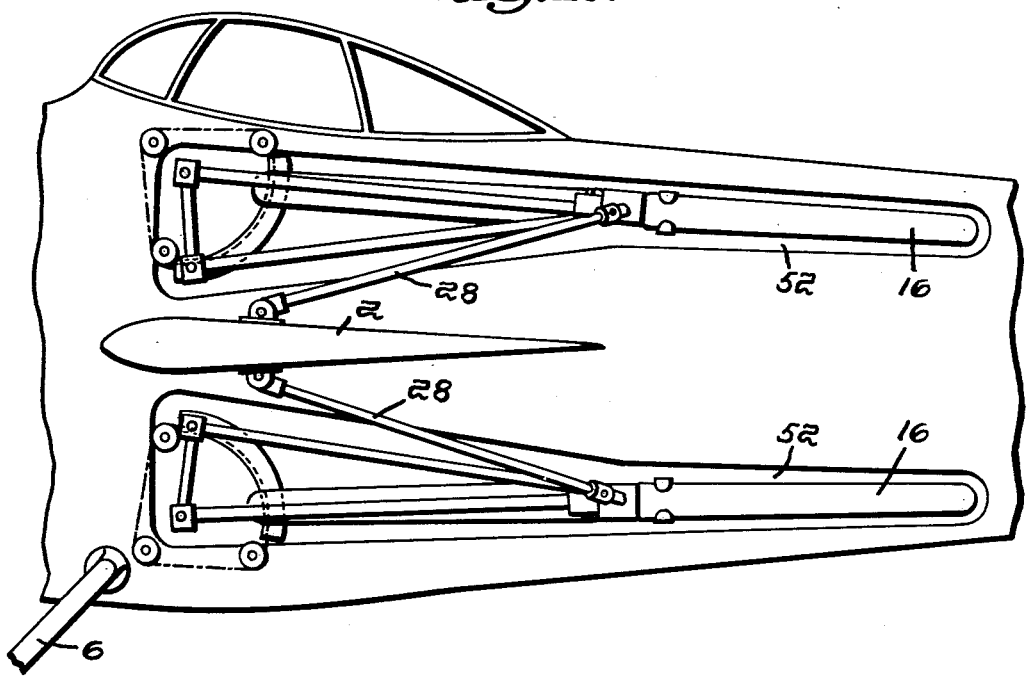
Fig. 17 is an enlarged fragmentary elevation of the port side of the machine shown in Fig. 16 with the helicopter blades in retracted position.

Still another modification is shown in Figs. 16 and 17. This construction contemplates an airplane with the wing approximately midway vertically of the fuselage to permit the inclusion of two rotors below the wing and two rotors above the wing. This arrangement may be needed where it is found necessary to provide greater lift or where it is desirable to use an increased number of shorter helicopter blades in preference to a single pair of longer blades. The operating and stowing mechanism for the pair of rotors below the wing is the same as that shown in Figs. 1 to 4 and the operating and stowing mechanism for the rotors above the wing is the same as that shown in Fig. 12, and it is believed unnecessary therefore, to describe these parts in further detail. Fig. 17 which is a side elevation of Fig. 16, shows the position of the two rotor blades stowed in their individual openings 52.

Another modification of the invention is shown in Figs. 18 to 25 inclusive. This construction differs from that previously described in the truss moving mechanism that results in the shifting of the rotors from operating to retracted position.

Figure 21:
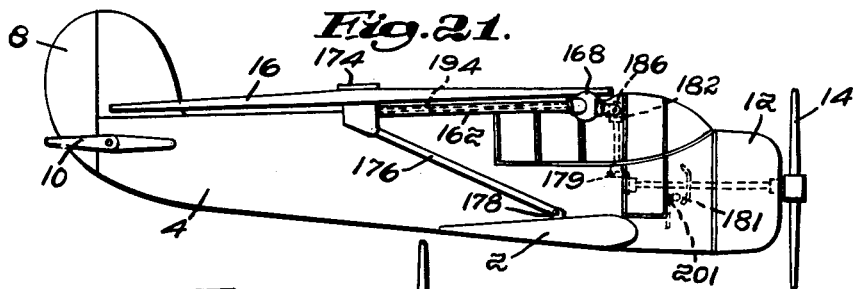
Fig. 21 is a side elevation of the machine shown in Figs. 18, 19 and 20 with the rotors in retracted position.

In all of the previously described arrangements, the rear inner end of the truss 18 was caused to swing in a generally vertical direction which resulted in moving the rotor to the rear to a position against the side of the fuselage. In the construction about to be described, the rear end of the truss, instead of being swung vertically, is swung horizontally inboard of the fuselage. This results in swinging the rotor to the rear against the fuselage in generally the same manner as explained heretofore. In the previous cases, however, of Figs. 1 to 17, the rotor blades while parallel to the sides of the fuselage when retracted assumed a position in which the rotor axis was horizontal, whereas in the modification about to be described, the blades while parallel to the top of the fuselage when retracted will be in horizontal position with the rotor axis vertical. In some constructions it will be more convenient to have the blades rest on top of the fuselage in horizontal position as shown in Figs. 21 and 25, although it is appreciated that in this exposed condition there will be additional drag.

This last referred to modification will now be explained by further detailed consideration of Figs. 18 to 24. Reference in general will be made to only one of the rotors since, the rotors being symmetrical, a description of one will suffice for the other.

The rotor 16 is supported by a truss 160 having a leading member or leg 162, a rear member or leg 164 and a short connecting member 166. Member 166 gives added rigidity, but is not essential in supporting the rotor. The leg 162 is connected to the fuselage by a universal joint 168 which may be similar to the joint shown in Fig. 10 and through which the rotor drive shaft passes. The leg 164 is connected to the fuselage by a sliding arrangement provided by a roller 170 cooperating with track 172, all of which will be described in more detail hereinafter.

The outer end of truss 162 is connected to a gear box and rotor axis support 174 which includes the gearing that causes rotation of rotors 16 all in the same manner as heretofore described with respect to gear box 26. Also pivotally connected to gear box 174 is a strut or leg 176 having its lower end hinged at 178 to the upper surface of wing 2.

Figure 22:
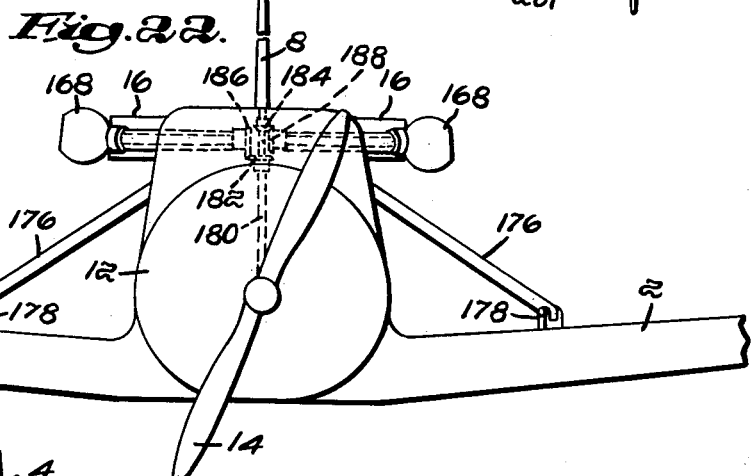
Fig. 22 is a front view of the construction shown in Fig. 21 drawn to enlarged scale.

As shown in Figs. 20, 21 and 22, a shaft 180 connectable by gears 179 and clutch 181 with the motor 12 provides means for driving the rotors. On the top of shaft 180 are beveled gears 182 and 184 which drive in the same rotary direction the cooperating beveled gears 186 and 188. Gear 186 is connected to the shaft which drives the left hand rotor 16 as viewed in Fig. 18, while gear 188 drives the right hand rotor 16. The following description will apply to the driving of the right hand rotor 16, the details of which are best shown in Fig. 23.

Gear 188 is connected to shaft 190 which leads through tubular member 189 to universal joint 192 and thence to shaft 194 located within a tubular member or leg 162. The outer end of shaft 194 carries a beveled gear 196 which cooperates with another beveled gear 198 on shaft 200 to which is attached rotor 16. Obviously, rotation of shaft 180 driven by motor 12 will cause rotation of the two rotors 16 at equal speeds and in opposite directions. A brake 201, similar to brake 51 heretofore described, is provided so that the rotors when stopped and disconnected from the engine by clutch 181 may be maintained in proper position for stowing in retracted position over the fuselage.

Figure 23:
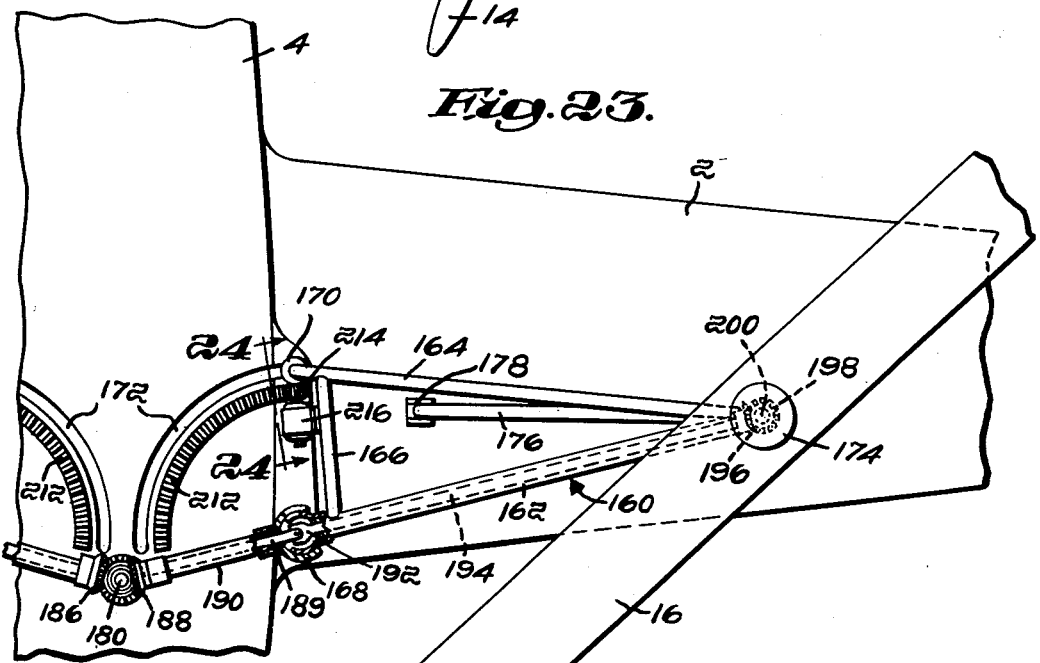
Fig. 23 is a further enlarged more detailed plan view of the rotor driving mechanism and retracting means similar to that shown in Fig. 18.
Figure 24:
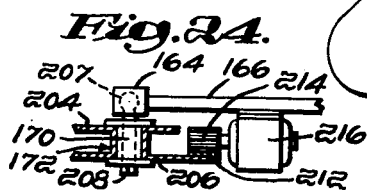
Fig. 24 is a view on the line 24—24 of Fig. 23 showing further details of the retracting mechanism.

The mechanism for moving the truss 162 and strut 176 to the rear so that the rotors can be stowed as shown in Fig. 25 is shown most clearly in Figs. 23, 24 and 25. A curved track 172 consisting of a pair of curved horizontally disposed U-sections 204 and 206 are securely affixed to the frame. The inner end of member 164 has secured thereto by a ball and socket joint 207 or other suitable pivoted connection, a vertically disposed shaft 208 on which is mounted roller 170 fitting within the confines of track 172. The roller has flanges top and bottom so that it will be securely maintained within the track. Parallel to track 172 is a curved rack 212 having its center coinciding with the universal joint 192. This rack is located to cooperate with a pinion 214 mounted on the shaft of motor 216, which motor in turn is securely attached to the short member 166 of truss 160. Thus, when motor 216 is actuated, gear 214 will travel along track 212 moving the truss 160 and leg or strut 176 and rotor 16 to the retracted position shown in Figs. 21, 22 and 25. The retraction of both rotors occurs simultaneously as both motors 216 (see Fig. 18) function together.

Since the inner ends of members 162 and 164 of truss 160 remain in a horizontal position when the rotor is retracted, it follows that the gear box 174 to which the truss members are attached will likewise remain in substantially vertical position and the rotor 16 when swung to the rear will likewise have its axis vertical and blades remaining in substantially a horizontal plane (see Figs. 21, 22 and 25). In the retracted position shown in these figures, the rotors are located exterior of the fuselage. However, it will be understood that the fuselage might have its configuration altered sufficiently to provide cavities having the same purpose as cavities 52 shown in Figs. 3 and 4 for example, into which the rotors might be placed to be out of the air stream if desired. On the other hand, the small frontal area of the rotors when in retracted position as in Figs. 21, 22 and 25 does not prohibitively increase the drag. In any event the machine will function as intended when made according to the disclosure of Figs. 18 to 25.

The construction of the universal joint 192 can be made similar to that disclosed in Fig. 10 and the gearing of the rotor 16 will be arranged so that when the operative rotor is in crosswise position with respect to the machine, it will be in proper position to be swung to retracted position. The universal joint both as to the tubular members 162 and 189 as well as the drive shaft 190 and 194 will permit swinging movement of member 162 from the position shown in Figs. 18 and 23 to the retracted position as shown in Figs. 21, 22 and 25. The joint arrangement at 192 need have flexibility in two planes only as the truss 160 and member 162 is not rotated axially with respect to member 189. It merely swings in a generally horizontal plane with respect to member 189. However, as stated above, the construction shown in Fig. 10 is not only effective to take care of the required more complicated movement shown in Figs. 1 to 17, but also the somewhat simpler movement shown in Figs. 18 to 25.

Other means of swinging the truss 160 from the extended position of Fig. 18 to the retracted position of Fig. 25 may be provided. One such alternative construction could be that already explained in the discussion relating to Figs. 5, 6 and 7 and other means will readily suggest themselves as mechanically equivalents thereof.

Figs. 26, 27 and 28 illustrate a further modification of the invention in which jet propulsion is utilized. The principle of operation of the machine shown in these figures is otherwise the same as that of the forms heretofore described. Instead of using a motor to drive a conventional propeller and the rotors, jet propulsion of any of the forms now available or which may become available may be used.

Referring to Figs. 26, 27 and 28 the machine shown comprises the usual body formation 230 of any selected type having customary high or low wings. There are the usual tail surfaces 234 and 236. The plane receives its forward velocity when in normal flight from a turbo-jet 238 located within the body of the plane. Other jet motors could be utilized in conventional ways if desired.

The helicopter rotors 240 are mounted in relation to the wings 232 in the same manner as the motor driven rotors previously referred to. There are the two upper struts or legs 242 and 244 and the lower strut or leg 246. Means is provided similar to that explained in connection with Figs. 3 to 9 for swinging the rear strut 244 in a vertical direction to cause the rotor 240 to move from extended operating position to retracted rear position against the fuselage. If preferred, the rotor supporting mechanism could be arranged as shown in Figs. 18 to 25 in which case the rotors 240 would lie when retracted in horizontal position on top of the fuselage instead of in vertical position along side of the fuselage as shown in Figs. 26 and 27.

The rotors instead of being mechanically driven as disclosed in Figs. 1 to 25 are jet propelled through the utilization of suitable jet elements 248 and 250 located in the tips of the rotors. These jets are supplied with fuel by a fuel line 252 which extends from the fuselage or wing through one of the legs 242, 244 or 246. As shown in Fig. 28 the fuel line extends through the forward leg 242. The fuel line is capable of bending at the universal joint 254 of the forward strut 242 so that when the rotor is swung to retracted position, the fuel line can bend correspondingly to meet the changing conditions.

Rotor 240 as shown in Figs. 27 and 28 is mounted on a hub or axis 256 which in turn is supported by bearings 258 carried in a housing 260, thus permitting free rotation of the rotor. The fuel line 252 feeds through a rotating connection 262 into the passage 264 which in turn splits into two passages or pipes 266 and 268 extending to the tips of the rotor and discharging into the jet burners 248 and 250. Leg 246 connects by a ball and socket joint 270 with the housing 260.

While reference has been made to the jet elements 248 and 250, functioning through the burning of fuel, it will be understood that they are also capable of functioning in the manner required by the ejection of compressed air that could be delivered to the jets through the fuel line and related passages. The source of compressed air will be any suitable type of compressor which can be installed in the body of the machine.

With the rotors in extended operating position and with jets 248 and 250 functioning, the machine can rise vertically and when at a suitable height, turbo-jet 238 will come into operation to give the necessary forward speed so that the machine will then be carried by its wings 232, after which the rotors can be folded to retracted position.

In order to stop the rotors 240 at correct positions for stowing, there is provided on each rotor a brake 272 operable by an encased wire 274 shown affixed to leg 242. The brake can be manually operated to stop the rotor at the correct angular position after the plane is in normal flight prior to the stowing operation. This will insure that the rotors will lie properly against the fuselage when swung to the rear.

The operation of all forms of the machine shown in Figs. 1 to 25 is as follows: Assuming the convertiplane to be resting on the ground with the rotors stowed, the rotors are first swung out to operating position. The engine is started and propeller 14 of the controllable pitch type is turned to feathering position. The clutch that drives shaft 32 or 180, see Figs. 14 and 20, is then engaged to initiate rotation of rotors 16. The gearing causes the rotors to revolve in opposite directions, thus avoiding any torque effect. The engine is then speeded up to the degree necessary to produce sufficient lift by rotors 16 to cause the machine to rise vertically. When the machine is high enough to safely clear surrounding objects, the pitch of propeller 14 is modified to cause the machine to move forward. In due course, sufficient forward velocity will be attained so that wing 2 will then support the plane as in normal airplane flight. When this condition has been reached the clutch driving shaft 32 or 180 will be disengaged so that rotors 16 may come to a stop. After the rotors 16 have stopped, supplemental means may be provided for manually or mechanically rotating drive shafts 36 or 180 as much as is necessary to bring rotors 16 to the required transverse position for stowing. The rotors may then be held in this position by any convenient mechanism, such as brake 51 or brake 201, after which motor 78 of Fig. 5, motor 86 of Fig. 9 or motor 216 of Fig. 23, depending upon which construction is used, will be actuated to swing the end of member 22 in its vertical arc or member 164 in a horizontal arc, thereby to cause the trusses 18 or 160 and struts 28 or 176 to swing to the rear to deposit rotors 16 simultaneously within cavities 52 in the sides of the fuselage or in parallel relation on top of the fuselage as in Fig. 25.

The machine then continues in normal flight with wing 2 acting as the sole means of support. When the destination is reached, the procedure is reversed. While still supported by wing 2, the rotors 16 are swung outwardly to operative position, unbraked and then set in operation by throwing in the clutch that controls shaft 32 or 180. As soon as the rotors have been brought up to speed so as to provide enough lift, the propeller 14 is gradually feathered so that the machine loses its forward velocity and the lift of wing 2 is transferred to rotor 16. The motor is then slowed down enough to allow the machine to drop slowly vertically until it has reached the ground.

The operation of the jet propelled form of the invention is substantially the same as that of the conventional engine driven type. The jets on the rotors are set in operation bringing the rotors up to speed and raising the machine substantially vertically from the ground. When a suitable height has been reached, the turbo-jet which, up to this time, has been running at slow speed, is brought up to sufficient power to drive the machine ahead at a velocity adequate to cause the machine to be supported by its wings. When this point is reached the jets in the rotors can be cut off and the rotors are then stopped by the brakes at a proper angular position to permit stowing. The stowing mechanism is then operated so that the rotor blades are swung to the rear to lie parallel to the fuselage. When the machine is to descend the turbo-jet is slowed down, the rotors are moved from retracted to extended position, the rotor jets are put in operation so that when the forward speed of the plane is further reduced below the velocity of wing support, the rotors can take over, after which the turbo-jet can be reduced to idling speed or cut off. The rotors will then be manipulated at proper speed to cause the machine to descend vertically to its landing place.

When reference is made in the claims to a rotor, it will be understood that such rotor contemplates rotors of the propeller type, motor or jet propelled, as disclosed in Figs. 1, 12, 16, 18, 25, 26 and 27 as well as rotors of the roller type shown in Fig. 13. It will also be understood in the claims that where the airplane is claimed in combination with a single rotor it is to be understood that there will always be 2 or 4 rotors rotating in opposite directions symmetrically located with respect to the port and starboard wings of the machine to produce balanced lift without a torque effect.

Throughout the foregoing explanation the rotors have been described as being supported by a three legged truss, one of the legs being connected to the wing and the other two legs being connected to the fuselage. Those two legs that are connected to the fuselage are in the ordinary case connected together at their inner ends by a short member such as element 24 shown in Figs. 1 to 4, element 166 shown in Figs. 18 to 25 and element 245 shown in Figs. 26, and 27. This element in all cases assists in rotating the forward upper strut as the inner end of the rear upper strut is swung forwardly with respect to the fuselage. It will be appreciated that other supporting means could be used which would be the full equivalent of the structure disclosed. For example, the two upper struts or legs and the connecting short inner element could be replaced by a solid triangular sheet with its two inner corners connected to the fuselage. Such sheet, of course, would need to be strong enough to stand the compressive loads that the rotor would apply thereto and while perhaps not as suitable a structure from an aerodynamic standpoint, nevertheless, could be used. The structure recited in the claims as to the struts and legs on which the rotors are mounted is intended to cover all equivalent mechanical arrangements which when manipulated in the manner described will cause the rotor to swing from operating to stowed position and vice-versa.

It is my intention to cover all changes and modifications of the example of the invention herein chosen for purposes of the disclosure which do not constitute departures from the spirit and scope of the invention.

I claim:

1. In combination with an airplane having a single wing and fuselage, a truss extending laterally from the fuselage, a strut pivotally connecting the end of said truss to said wing, a rotor for providing vertical lift mounted for rotation in a generally horizontal plane on said truss and means for swinging the rear end of said truss adjacent said fuselage in a direction forwardly of said airplane to cause the junction of said truss and strut to swing rearwardly to a position adjacent to said fuselage and to place said rotor substantially parallel to said fuselage.

2. In combination with an airplane having a single wing and fuselage, a truss extending laterally from the fuselage, a strut pivotally connecting the end of said truss to the said wing, a rotor for providing vertical lift mounted for rotation in a generally horizontal plane on said truss and means for swinging the rear end of said truss adjacent said fuselage in a generally vertical plane towards said wing to cause the junction of said truss and strut to swing rearwardly to a position adjacent the side of said fuselage and to place said rotor substantially parallel to said fuselage.

3. In combination with an airplane having a single wing and fuselage, a truss extending laterally from the fuselage, a strut pivotally connecting the end of said truss to the said wing, a rotor for providing vertical lift mounted for rotation in a generally horizontal plane on said truss and means for swinging the rear end of said truss adjacent said fuselage in a generally horizontal plane toward the front of said airplane to cause the junction of said truss and strut to swing rearwardly to a position adjacent said fuselage and to place said rotors substantially parallel to said fuselage.

4. The combination set forth in claim 1, said truss being connected to said fuselage at a forward point and at a rear point, the forward point of connection being a joint permitting the said swinging of said truss to the rear against said fuselage and the rear point of connection of said truss being movable in an arc.

5. The combination set forth in claim 1, said truss comprising a forward tubular member and having a drive shaft extending through said tubular member for actuating said rotor, said forward member and drive shaft having joints at substantially the same position whereby said member and drive shaft may be simultaneously swung with respect to said fuselage.

6. In combination with an airplane having a single wing and fuselage, a truss extending laterally from said fuselage, said truss comprising a forward leg and a rear leg and being triangular in form with its short side generally parallel to the said fuselage, a strut pivotally connecting the outer end of said truss to the said wing, a pivotal joint at the point of connection of the said forward leg of said truss and said fuselage, a rotor for providing vertical lift mounted for rotation in a generally horizontal plane on the outer end of said truss, a drive shaft extending through said forward leg and including a pivotal joint at substantially the point of said first joint, said drive shaft acting to provide power for causing rotation of said rotor and means for swinging the rear end of said truss in a forward direction with respect to said fuselage and in an arc with respect to said first joint to cause the junction of said truss and strut to swing rearwardly to a position adjacent said fuselage to place said rotor substantially parallel to said fuselage.

7. The combination of an airplane including a single wing and a fuselage and a pair of helicopter rotors positioned in vertical relation to said wing, one rotor being on each side of said fuselage, a motor, a propeller for moving said machine in normal flight, drive shafts connecting said motor with said rotors, supporting structure for said rotors comprising a truss and a strut, said truss pivotally connected to said fuselage and said strut pivotally connected to said wing and the outboard end of said truss and means for turning said truss about one point of connection with said fuselage whereby the said outboard end and strut and the connected rotor will be swung to the rear to a position substantially parallel to said fuselage.

8. The combination of an airplane having a single wing and a fuselage, a pair of helicopter rotors positioned in vertical relation to said wing, trusses pivotally connected to the fuselage and struts pivotally connected to said wing, each truss and its respective strut connected together for supporting said rotors, a motor, drive shafts from said motor to each of the said rotors and means for turning each strut with respect to said fuselage about its pivotal connection whereby the point of connection between each said truss and strut will be caused to swing to the rear to a position close to said fuselage.

9. The combination of an airplane having a single wing and a fuselage, a pair of helicopter rotors positioned below the wing and a second pair of rotors above the wing, trusses pivotally connected to the fuselage and struts pivotally connected to said wing both above and below each wing, each truss and its respective strut connected together for supporting said rotors, a motor, drive shafts from said motor to each of said rotors, and means for turning each truss with respect to said fuselage about its pivotal connection whereby the point of connection between each said truss and strut will be caused to swing to the rear to a position close to said fuselage.

10. In combination, an airplane having a single wing and a fuselage and a supporting mechanism for a helicopter rotor used therewith, said mechanism comprising a forward leg member and a rear leg member forming a truss and a strut connected at a common junction laterally of the fuselage and spaced vertically from the wing, the inboard ends of said leg members being pivotally connected to the fuselage at spaced points, the other end of said strut being pivotally connected to said wing at a point to the rear of the point of connection of the forward leg member and towards the fuselage from said junction, a rotor carried at the said junction and means for moving the point of connection of the rear leg member in an arc with respect to the said point of connection of the forward leg member with said fuselage whereby said rotor will be caused to move to a position rearwardly of said airplane and against said fuselage.

11. In combination set forth in claim 10, said fuselage having a longitudinal depression for receiving said rotor.

12. The combination set forth in claim 10 and in addition a drive shaft in said forward leg member and gears at said junction connecting said drive shaft to said rotor.

13. A combination monoplane and helicopter forming a unitary machine comprising a single wing and a fuselage, a pair of helicopter rotors, each located on opposite sides of said fuselage and in spaced vertical relation to said wing, a motor, a propeller for creating forward movement of said monoplane, means for driving said rotors by said motor whereby said machine may rise vertically in the air, means for stopping rotation of said rotors at predetermined positions with respect to said wing after said machine has gained sufficient forward speed to be supported by said wing and means for swinging said stationary rotors from their normal operating positions to stowed positions parallel to and close against said fuselage.

14. A combination monoplane and helicopter as set forth in claim 13, said fuselage having a recess for receiving said rotor in stowed position.

15. A combination monoplane and helicopter forming a unitary machine comprising a single wing and fuselage, a helicopter rotor located in spaced vertical relation to the starboard portion of said wing, a helicopter rotor located in spaced vertical relation to the port portion of said wing, legs connecting said rotors with said wing and fuselage, a motor, means for driving said rotors by said motor whereby said machine may rise vertically in the air, a motor driven propeller for creating forward movement of said machine after said machine has been raised by said rotors, means for stopping rotation of said rotors at predetermined angular relation with respect to said wing after said machine has gained sufficient forward speed to be supported by said wing and means for simultaneously swinging said legs with respect to said fuselage and wing from the position in which they support the rotors in normal operating position to positions where each rotor will be close to and substantially parallel with the fuselage of said machine.

16. A combination monoplane and helicopter comprising a single wing and fuselage, two helicopter rotors symmetrically located in spaced vertical relation to said wing and on opposite sides of said fuselage, three legs connecting each of said rotors to said wing and fuselage, means for stopping said rotors at determined positions and means for moving said legs to positions where each said rotor will lie substantially against and parallel to said fuselage.

17. A combination monoplane and helicopter comprising a single wing and fuselage, two helicopter rotors symmetrically located in spaced vertical relation to said wing and on opposite sides of said fuselage, three legs connecting each of said rotors to said wing and fuselage, means for stopping said rotors at determined positions and means for moving said legs to positions where each said rotor will lie substantially against and parallel to said fuselage and the axis of said rotor will be horizontal.

18. A combination monoplane and helicopter comprising a single wing and fuselage, two helicopter rotors symmetrically located in spaced vertical relation to said wing and on opposite sides of said fuselage, three legs connecting each of said rotors to said wing and fuselage, means for stopping said rotors at determined positions and means for moving said legs to positions where each said rotor will lie substantially against and parallel to said fuselage and the axis of said rotor will be vertical.

19. In combination with an aircraft having a fuselage and a fixed wing capable of sustaining said aircraft in flight, first and second helicopter rotors symmetrically located on opposite sides of said fuselage, in spaced vertical relation to said wing, first and second supporting mechanisms for said first and second rotors, respectively, said mechanisms each being pivotally connected to said fuselage and wing and adapted to move said rotors relative to said fuselage from a first extended position in the windstream of said aircraft at which position said rotors are operable to a second retracted position at which said rotors are inoperable and lie substantially parallel to said fuselage out of the windstream, means operable by the pilot of the aircraft for causing said rotors to be moved in flight by said mechanism from said retracted position into said extended and operating position to convert said fixed wing aircraft into a helicopter.

References Cited in the file of this patent

UNITED STATES PATENTS

| | | |
|---|---|---|
| 1,755,058 | Finley | Apr. 5, 1930 |
| 2,514,822 | Wolfe | July 11, 1950 |
| 2,531,976 | Garrett | Nov. 28, 1950 |
| 2,623,711 | Pullin | Dec. 30, 1952 |

FOREIGN PATENTS

| | | |
|---|---|---|
| 539,677 | Great Britain | Sept. 19, 1941 |